United States Patent [19]

Zondler et al.

[11] 3,879,399

[45] Apr. 22, 1975

[54] PROCESS FOR THE MANUFACTURE OF PIPERIDINE DERIVATIVES

[75] Inventors: Helmut Zondler, Allschwil, Switzerland; Wolfgang Pfleiderer, Constance, Germany

[73] Assignee: Ciba-Geigy AG, Basel, Switzerland

[22] Filed: Sept. 6, 1973

[21] Appl. No.: 394,893

Related U.S. Application Data

[63] Continuation-in-part of Ser. No. 325,462, Jan. 22, 1973, abandoned, which is a continuation of Ser. No. 133,445, April 12, 1971, abandoned.

[30] Foreign Application Priority Data

Apr. 13, 1970 Switzerland.......................... 5452/70

[52] U.S. Cl. .......................................... 260/293.52
[51] Int. Cl. ............................................. C07d 29/06
[58] Field of Search ................................ 260/293.52

[56] References Cited

UNITED STATES PATENTS

| | | | |
|---|---|---|---|
| 3,431,267 | 3/1969 | Welcher............................. | 260/293 |
| 3,728,353 | 4/1973 | Groen et al................... | 260/293.52 |

*Primary Examiner*—G. Thomas Todd
*Attorney, Agent, or Firm*—Vincent J. Cavalieri

[57] ABSTRACT

3-($\gamma$-aminopropyl)-piperidines can be manufactured by hydrogenating certain bis-cyanoethylated aldimines in the presence of a catalyst and preferably in the presence of an organic solvent. The hydrogenation can be executed at temperatures up to 200°C either without application of pressure or under pressure. Cyclisation occurs with a primary amin being split off.

The piperidine derivatives, obtainable according to this invention are suitable as curing agents for epoxy resins.

7 Claims, No Drawings

PROCESS FOR THE MANUFACTURE OF PIPERIDINE DERIVATIVES

This application is a continuation-in-part-application of our copending application Ser. No. 325,462, filed Jan. 22, 1973, which in turn is a continuation application of our copending application Ser. No. 133,445, filed Apr. 12, 1971, now abandoned.

The subject of the present invention is a process for the manufacture of 3-(γ-aminopropyl)-piperidines of the general formula:

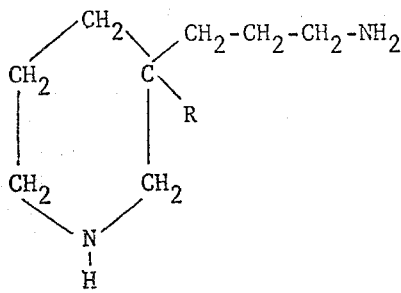

wherein R denotes an aliphatic hydrocarbon radical preferably containing 1 to 7 carbon atoms.

According to a publication of Takata, J. Chem. Soc. Jap. 85 (1964), 237 there was already a success in preparing 2,3-dimethyl-3-(γ-aminopropyl)-piperidine. However, it was not possible hitherto to prepare 3-(γ-aminopropyl)-piperidines of the formula I.

According to the invention, 3-(γ-aminopropyl)-piperidines of the formula I are obtained if cyanoethylated aldimines of the general formula

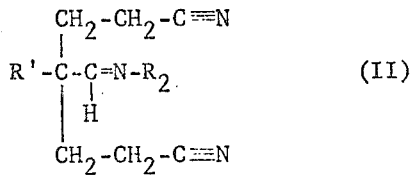

wherein R' denotes an aliphatic hydrocarbon radical preferably containing 1 to 7 carbon atoms and wherein $R_2$ denotes an aliphatic, cycloaliphatic, araliphatic or aromatic hydrocarbon radical, are catalytically hydrogenated, with $H_2N-R_2$ being split off and cyclisation occurring.

The process starts from bis-cyanoethylated aldimines manufactured according to known processes, which are derived from aliphatic aldehydes such as propionaldehyde, butyraldehyde, valeraldehyde or pelargonaldehyde.

The Schiff's bases obtained by reaction of the said aldehydes with primary monoamines of the aliphatic, cycloaliphatic, araliphatic or aromatic series, such as, for example, methylamine, ethylamine, iso-propylamine, iso-butylamine, cyclohexylamine or aniline, contain a protected aldehyde group, and can be cyanoethylated without interfering side-reactions according to known methods, for example in the presence of an alkali. Bis-cyanoethyl derivatives are thereby obtained, in which the cyanoethyl groups are located on the same carbon atom, which is in the α-position to the

group.

The cyanoethylated aldimines are hydrogenated catalytically according to the methods customary in the laboratory and in industry, at temperatures up to 200°C, preferably between 90° and 130°C either without application of pressure, or under pressure in an autoclave. Catalysts based on very finely divided metals of group VIII of the periodic system, such as platinum black, palladium black, Raney-cobalt and first of all Raney-nickel, or a Raney-nickel having a low palladium content, are preferably used as hydrogenation catalysts.

The hydrogenation is preferably executed in the presence of an organic solvent. Suitable solvents are alcohols, such as ethanol, propanol, butanol, isopropanol, tert.butanol; aromatics, as benzene, toluene, xylene; ethers, as dioxane, tetrahydrofurane or ethylenedimethylether.

The 3-(γ-aminopropyl)-piperidines manufactured according to the process of this invention are as a rule water-clear liquids of very low viscosity. They are suitable as curing agents in curable mixtures, which contain a polyepoxide compound.

Appropriately, 0.5 to 1.3 equivalents, preferably approx. 1.0 equivalent, of nitrogen-bonded active hydrogen atoms of the 3-(γ-aminopropyl)-piperidine of the formula I are used per 1 equivalent of epoxide groups of the polyepoxide compound in the curable mixtures.

Possible polyepoxide compounds are above all those having an average of more than one glycidyl group, β-methylglycidyl group or 2,3-epoxycyclopentyl group bonded to a hetero atom (for example sulphur, preferably oxygen or nitrogen); in particular, there may be mentioned bis-(2,3-epoxycyclopentyl)-ether; diglycidyl ethers or polyglycidyl ethers of polyhydric aliphatic alcohols, such as 1,4-butanediol, or polyalkylene glycols, such as polypropylene glycols; diglycidyl or polyglycidyl ethers of cycloaliphatic polyols, such as 2,2-bis-(4-hydroxycyclohexyl)propane; diglycidyl or polyglycidyl ethers of polyhydric phenols, such as resorcinol, bis-(p-hydroxyphenyl) methane, 2,2,-bis(p-hydroxyphenyl)-propane (=diomethane), 2,2-bis(4'-hydroxy-3',5',-dibromophenyl)propane, 1,1,2,2-tetrakis-(p-hydroxylphenyl)ethane, or of condensation products of phenols with formaldehyde obtained under acid conditions, such as phenol novolacs and cresol novolacs; di- or poly-(β-methylglycidyl)-ethers of the abovementioned polyhydric alcohols or polyhydric phenols; polyglycidyl esters of polybasic carboxylic acids, such as phthalic acid, terephthalic acid, $\Delta^4$-tetrahydrophthalic acid and hexahydrophthalic acid; N-glycidyl derivatives of amines, amides and heterocyclic nitrogen bases, such as N,N-diglycidyl-aniline, N,N-diglycidyltoluidine, N,N,N',N'-tetraglycidyl-bis(p-aminophenyl)-methane; triglycidyl-isocyanurate; N,N-diglycidyl-ethyleneurea; N,N'-diglycidyl-5,5-dimethylhydantoin, N,N'-diglycidyl-5-isopropylhydantoin; N,N'-diglycidyl-5,5-dimethyl-6-isopropyl-5,6-dihydrouracil.

If desired, active diluents such as, for example, styrene oxide, butyl glycidyl ether, isooctyl glycidyl ether, phenyl glycidyl ether cresyl glycidyl ether, and glycidyl esters of synthetic, highly branched, mainly tertiary aliphatic monocarboxylic acids (("CARDURA E") can be added to the polyepoxides to reduce the viscosity.

The curing of the curable mixtures to give mouldings and the like is appropriately effected in the temperature range of 20° to 150°C. The curing can also be carried out in a known manner in two or more stages, in which case the first curing stage is carried out at a lower temperature and the post-curing at a higher temperature.

The curing can, if desired, also be carried out in two stages in such a way that the curing reaction is firstly prematurely stopped and/or the first stage is carried out at room temperature or only slightly elevated temperature, whereby a curable precondensate (so-called "B-stage") which is still fusible and soluble is obtained from the epoxide component and the amine curing agent. Such a precondensate can for example serve for the manufacture of "prepregs", compression moulding compositions or, especially, sintering powders.

In order to shorten the geling times or curing times, known accelerators for the amine curing reaction, for example monophenols or polyphenols, such as phenol or diomethane, salicylic acid, tertiary amines or salts of thiocyanic acid, such as $NH_4SCN$, can be added.

The term "curing", as used here, denotes the conversion of the soluble, either liquid or fusible, polyepoxides into solid, insoluble and infusible, three-dimensionally crosslinked products or materials, and in particular, as a rule, with simultaneous shaping to give mouldings such as castings, pressings, laminates and the like or "sheet-like structures" such as coatings lacquer films or adhesive bonds.

The curable mixtures of polyepoxide compounds and 3-(γ-aminopropyl)-piperidines of the formula I used as curing agents can furthermore be mixed, in any stage before curing, with customary modifiers, such as extenders, fillers and reinforcing agents, pigments, dyestuffs, organic solvents, plasticisers, flow control agents, agents for conferring thixotropy, flame-proofing substances or mould release agents.

As extenders, reinforcing agents, fillers and pigments which can be employed in the curable mixtures according to the invention there may, for example, be mentioned: coal tar, bitumen, textile fibres, glass fibres, asbestos fibres, boron fibres, carbon fibres, cellulose, polyethylene powder and polypropylene powder; quartz powder; mineral silicates, such as mica, asbestos powder and slate powder; kaolin, aluminium oxide trihydrate, chalk powder, gypsum, antimony trioxide, bentones, silica aerogel ("AEROSIL"), lithopone, barytes, titanium dioxide, carbon black, graphite, oxide pigments, such as iron oxide, or metal powders, such as aluminium powder or iron powder.

Suitable organic solvents for modifying the curable mixtures are, for example, toluene, xylene, n-propanol, butyl acetate, acetone, methyl ethyl ketone, diacetone-alcohol, ethylene glycol monomethyl ether, monoethyl ether and monobutyl ether.

Dibutyl phthalate, dioctyl phthalate and dinonyl phthalate, tricresyl phosphate, trixylenyl phosphate and also polypropylene glycols can for example be used as plasticisers for modifying the curable mixtures.

Silicones, cellulose acetobutyrate, polyvinyl butyral, waxes, stearates and the like (which are in part also used as mould release agents) can be added as flow control agents when employing the curable mixtures, particularly for surface protection.

Particularly for use in the lacquer field, the polyepoxide compounds can furthermore be partially esterified in a known manner with carboxylic acids, such as, especially, higher unsaturated fatty acids. It is furthermore possible to add other curable synthetic resins, such as for example phenoplasts or aminoplasts, to such lacquer resin formulations.

The manufacture of the curable mixtures can be carried out in the usual manner with the aid of known mixing equipment (stirrers, kneaders, rolls and the like).

The curable epoxide resin mixtures according to the invention are above all employed in the fields of surface protection, the electrical industry, laminating processes and the building industry. They can be employed in a formulation adapted in each case to the special end use, in the unfilled or filled state, optionally in the form of solutions or emulsions, as paints, lacquers, sintering powders, compression moulding compositions, injection moulding formulations, dipping resins, casting resins, impregnating resins, binders and adhesives, tool resins, laminating resins, sealing and filling compositions, floor covering compositions and binders for mineral aggregates.

The most important industrial uses lie in the field of casting resins, adhesives and surface protection.

In the examples which follow, unless otherwise stated, parts denote parts by weight and percentages denote percentages by weight. The relationship of parts by volume to parts by weight is as of the millilitre to the gram.

The following epoxide resins were used for the manufacture of curable mixtures described in the examples:

EPOXIDE RESIN A

Polyglycidyl ether resin (technical product) manufactured by condensation of diomethane (2,2-bis-[p-hydroxyphenyl]-propane) with a stoichiometric excess of epichlorohydrin in the presence of alkali, which is liquid at room temperature, consists mainly of diomethane-diglycidyl ether of the formula

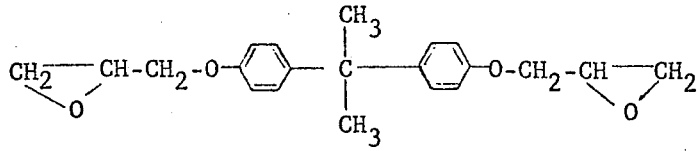

and has the following characteristics:

Epoxide content: 5.1–5.5 epoxide equivalents/kg
Viscosity (Hoeppler) at 25°C: 9,000 – 13,000 cP.

EPOXIDE RESIN B

Polyglycidyl ether resin (technical product) manufactured by condensation of hydrogentated diomethane [2,2-bis-(p-hydroxycyclohexyl)-propane] with a stoichiometric excess of epichlorohydrin in the presence of alkali, which is liquid at room temperature, consists mainly of diomethanediglycidyl ether of the formula

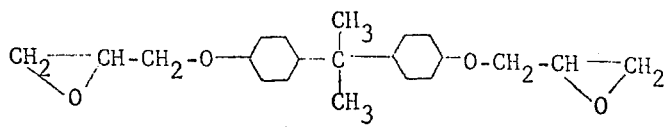

and has the following characteristics:

Epoxide content: 4.9 epoxide equivalents/kg
Viscosity (Hoeppler) at 25°C: 1,250 cP.

To determine the mechanical and electrical properties of the curable mixtures described in the examples which follow, sheets of 135 × 135 × 4 mm were manufactured for determining the flexural strength, deflection, impact strength and water absorption. The test specimen (60 × 10 × 4 mm) for determining the water absorption and for the flexural test and impact test (VSM 77, 103 and VSM 77, 105, respectively) were machined from the sheets.

MANUFACTURE OF 3-(γ-AMINOPROPYL)-PIPERIDINES

I. 3-Methyl-3-(γ-aminopropyl)-piperidine 200 g of N-isopropyl-2,2-bis-(β-cyanoethyl)-propionaldimine of the formula

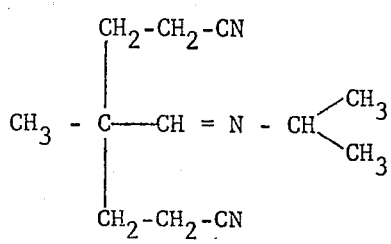

are dissolved in 400 ml of ethanol and hydrogenated with Raney-nickel, activated with 2% of palladium, at 100° – 110°C, within a few hours at 100 atmospheres gauge, in an autoclave. Fractional distillation of the mixture from the reduction through a 40 cm packed column yields 88.4 g of crude produce (58% of the theoretical yield) of boiling point 109°–118°C/12 mm, consisting mainly of 3-methyl-3-(γ-aminopropyl)-piperidine of the formula

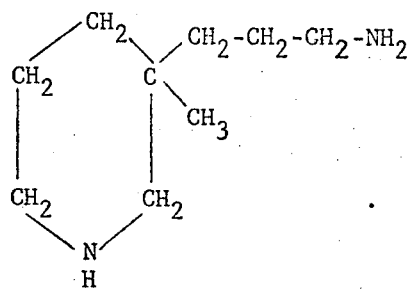

If Raney-cobalt if used instead of the nickel catalyst, the reduction only takes place at 140°C. The crude yield is then 62% of the theoretical yield.

For analytical investigations, the crude product was again fractionated and a sample was withdrawn at a boiling point of 110°–112°C/8 mm Hg.

Analysis: $C_9H_{20}N_2$ (M = 156.27)
Calculated:   C 69.18   H 12.90   N 17.92
Found:   C 68.70   H 12.79   N 17.81

NMR-spectrum in $CCl_4$:

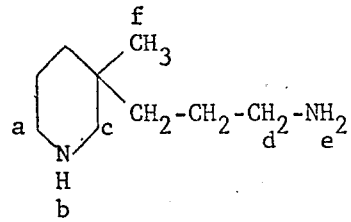

2 $H_2$+ 2 $H_c$+ 2 $H_d$
    Multiplet 2.8 - 2.35 δ

1 $H_b$+ 2 $H_e$
    Singlet 0.93 δ

3 $H_f$   Singlet 0.84 δ

NMR-spectrum in $D_2O$: 3 replaceable H atoms.

| IR-spectrum: Band | Interpretation |
|---|---|
| 3380 cm⁻¹, medium intensity | NH stretching vibration of the primary amino group |
| 3300 cm⁻¹, intense | NH stretching vibration of the primary amino group NH stretching vibration of the secondary amino group |
| 3200 cm⁻¹, shoulder | Harmonic vibration of the $NH_2$ deformation at 1600 cm⁻¹ |
| 1600 cm⁻¹, intense | Deformation vibration of the primary $NH_2$ group |
| 1670 cm⁻¹, shoulder | Deformation vibration of the secondary NH group |

II. 3-Ethyl-3-(γ-aminopropyl)-piperidine a. 155 g of N-tert.butyl-2,2-bis-(β-cyanoethy)-n-butyraldimine are dissolved in 200 ml of ethanol and hydrogenated with Raney-nickel, activated with 2% of palladium, at 180°C and 100 atmospheres gauge in an autoclave.

Fractional distillation in vacuo yields 53.0 g of 3-ethyl-3-(γ-aminopropyl)-piperidine (47% of the theoretical yield) of boiling point 120.5°–124°C/8 mm Hg.

For analysis, the material was again fractionated through a column and a sample was withdrawn at boiling point 118°–119°C/7 mm Hg.

Analysis: $C_{10}H_{22}N_2$ (M = 170.30)
Calculated:   C 70.53   H 13.02   N 16.45
Found:   C 70.84   H 12.63   N 16.37

NMR spectrum in $CCl_4$:

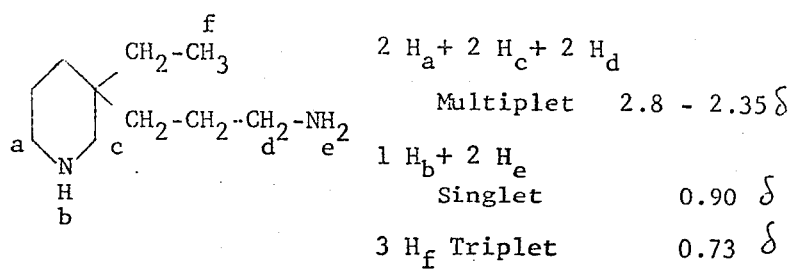

| | |
|---|---|
| $2\,H_a + 2\,H_c + 2\,H_d$ Multiplet | $2.8 - 2.35\,\delta$ |
| $1\,H_b + 2\,H_e$ Singlet | $0.90\,\delta$ |
| $3\,H_f$ Triplet | $0.73\,\delta$ |

NMR spectrum in $D_2O$: 3 replaceable H atoms.

| IR-spectrum: Band | Interpretation |
|---|---|
| 3360 cm⁻¹, medium intensity | NH stretching vibration of the primary amino group |
| 3290 cm⁻¹, intense | NH stretching vibration of the primary amino group NH stretching vibration of the secondary amino group |
| 3200 cm⁻¹, shoulder | Harmonic vibration of the $NH_2$ deformation at 1610 cm⁻¹ |
| 1610 cm⁻¹, intense | Deformation vibration of the primary $NH_2$ group |
| 1670 cm⁻¹, weak shoulder | Deformation vibration of the secondary NH group | b. 198 g of N-isopropyl-2,2-bis-(β-cyanoethyl)-n-butyraldimine are dissolved in 250 ml of ethanol and hydrogenated with Raney-nickel, containing 2% palladium, at 120°–130°C and 70 atmospheres gauge in an autoclave. The $H_2$ is absorbed within a few hours. Fractional distillation yields 79.8 g of 3-ethyl-3-(γ-aminopropyl)-piperidine (52% of the theoretical yield) of boiling point 119°–126°C/9 mm Hg.

CURABLE MIXTURES

Example 1 a. 63 parts of epoxide resin A are homogenously mixed at room temperature with 15.3 parts of 3-methyl-3-(γ-aminopropyl)-piperidine (corresponding to a ratio of epoxide equivalent to active nitrogen-bonded H atoms = 1.0 :0.9), and the mixture is degassed in a high vacuum and poured into aluminium moulds. The moulding composition gels whilst becoming warm exothermically, and after cooling is postcured for a further 24 hours at 100°C in a drying cabinet.

The castings obtained have the following properties:

| | | |
|---|---|---|
| Flexural strength (VSM 77,103) | = 13.5 | kg/mm² |
| Deflection (VSM 77,103) | = 17 | mm |
| Impact strength (VSM 77,105) | = 57 | cmkg/cm² |
| Water absorption (24 hours at 20°C) | = 0.07 | % |
| Glass transition temperature | = 119 | °C | b. Castings manufactured by casting the curable moulding composition described above under a into prewarmed aluminium moulds of sizes 140 × 140 × 4 mm and curing for 4 hours at 80°C and subsequently for 12 hours at 140°C have the following properties:

| | | |
|---|---|---|
| Flexural strength (VSM 77,103) | = 10.9 | kg/mm² |
| Deflection (VSM 77,103) | = 13 | mm |
| Impact strength (VSM 77,105) | = 77 | cmkg/cm² |
| Water absorption (24 hours, 20°C) | = 0.12 | % |
| Heat distortion point (ISO R75) | = 90 | °C |

Example 2

A curable mixture is manufactured analogously to the description in Example 1, from 63 parts of epoxide resin A and 18.7 parts of 3-ethyl-3-(γ-aminopropyl)-piperidine (corresponding to a ratio of epoxide equivalents to active nitrogen-bonded H atoms = 1.0 :1.0). The mixture is poured into moulds, and cured, in accordance with Example 1a.

The castings have the following properties:

| | | |
|---|---|---|
| Flexural strength (VSM 77,103) | = 11.1 | kg/mm² |
| Deflection (VSM 77,103) | = 19 | mm |
| Impact strength (VSM 77,105) | = 24 | cmkg/cm² |
| Water absorption (24 hours, 20°C) | = 0.06 | % |
| Glass transition temperature | = 88 | °C |

Example 3

The following mixture is prepared and cured analogously to the description given in Example 1a and 1b.

100 parts of epoxide resin B + 25.5 parts of 3-methyl-3-(γ-aminopropyl)-piperidine.

The castings obtained have the following properties:

| | |
|---|---|
| Flexural strength | 11,2 kg/mm² |
| Heat distortion point | 85°C |
| Deflection | > 16,7 mm |
| Glass transition temperature | 99°C |

We claim:

1. A process for the manufacture of 3-(γ-aminopropyl)-piperidines of the formula

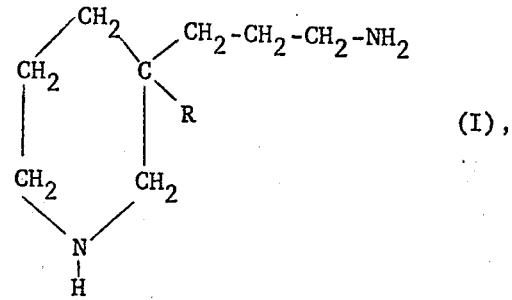

wherein R denotes an aliphatic hydrocarbon radical preferably containing 1 to 7 carbon atoms, characterised in that cyanoethylated aldimines of the general formula

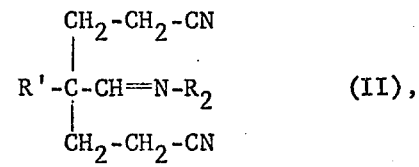

wherein R' denotes an aliphatic hydrocarbon radical preferably containing 1 to 7 carbon atoms and wherein $R_2$ denotes an aliphatic, cycloaliphatic, araliphatic or aromatic hydrocarbon radical, are catalytically hydrogenated at temperatures up to 200°C, with $H_2N-R_2$ being split off and cyclisation occurring.

2. A process according to claim 1, characterised in that N-isopropyl-2,2-bis-(β-cyanoethyl)-propionaldimine is employed as the cyanoethylated aldimine of the general formula II.

3. A process according to claim 1, characterised in that N-tert.-butyl-2,2-bis-(β-cyanoethyl)-n-butyraldimine is employed as the cyanoethylated aldimine of the formula II.

4. A process according to claim 1, characterised in that a metal of group VIII of the periodic system is employed as catalyst.

5. A process according to claim 1, characterised in that the hydrogenation is executed at temperatures between 90° and 130°C.

6. A process according to claim 1, characterised in that the hydrogenation is executed in the presence of an organic solvent.

7. A process according to claim 6, characterised in that an alcohol is employed as an organic solvent.

* * * * *